(12) United States Patent
Gates et al.

(10) Patent No.: US 11,524,753 B2
(45) Date of Patent: Dec. 13, 2022

(54) BOAT FENDER WITH IMPROVED IMPACT PROTECTION

(71) Applicant: Impact CBS, Inc., Durango, CO (US)

(72) Inventors: Courtney Gates, Durango, CO (US); Brian Slaughter, Durango, CO (US)

(73) Assignee: Impact CBS Inc., Durango, CO (US)

( * ) Notice: Subject to any disclaimer, the term of this patent is extended or adjusted under 35 U.S.C. 154(b) by 119 days.

(21) Appl. No.: 16/922,651

(22) Filed: Jul. 7, 2020

(65) Prior Publication Data

US 2021/0009241 A1  Jan. 14, 2021

Related U.S. Application Data

(60) Provisional application No. 62/871,518, filed on Jul. 8, 2019.

(51) Int. Cl.
*B63B 59/02* (2006.01)
*B63B 59/04* (2006.01)

(52) U.S. Cl.
CPC ............ *B63B 59/02* (2013.01); *B63B 59/045* (2013.01)

(58) Field of Classification Search
CPC ......... B63B 59/00; B63B 59/02; B63B 59/04; B63B 59/045; E02B 3/26
USPC .......................... 114/219; 405/212, 215, 216
See application file for complete search history.

(56) References Cited

U.S. PATENT DOCUMENTS

| | | | |
|---|---|---|---|
| 2,117,121 A | 5/1938 | Urquhart et al. | |
| 3,000,021 A | 9/1961 | Lang | |
| 3,225,731 A | 12/1965 | McCulley | |
| 3,684,272 A | 8/1972 | Ticknor | |
| 4,940,009 A | 7/1990 | Keithley, Jr. | |
| 5,013,272 A | 5/1991 | Watkins | |
| 5,299,521 A | 4/1994 | Loucks | |
| 5,701,837 A | 12/1997 | Harvey | |
| 5,727,493 A * | 3/1998 | Pierce | B63B 59/02 114/219 |
| 5,732,645 A | 3/1998 | Lemke | |
| 5,839,854 A | 11/1998 | Streszoff et al. | |
| 9,789,937 B1 * | 10/2017 | Ratigan | B63B 59/02 |

* cited by examiner

*Primary Examiner* — Lars A Olson

(57) ABSTRACT

An impact absorbing device includes a waterproof outer sleeve and a core assembly disposed within the outer sleeve. The core assembly includes a bendable structural element encased in foam.

20 Claims, 6 Drawing Sheets

BOAT FENDER WITH IMPROVED IMPACT PROTECTION

CROSS-REFERENCE TO RELATED APPLICATIONS

This application claims priority to U.S. Provisional Patent Application No. 62/871,518, filed Jul. 8, 2019, the entire content of which is incorporated herein by reference.

FIELD

The present disclosure relates to boat fenders and dock bumpers.

BACKGROUND

Impact absorbing devices, such as boat fenders and dock bumpers, are typically used to protect watercraft from damage when approaching or when tied off to a dock, another boat, or other objects in a marine environment.

SUMMARY

In one aspect, the present disclosure provides an impact absorbing device including a waterproof outer sleeve and a core assembly disposed within the outer sleeve. The core assembly includes a bendable structural element encased in foam.

In another aspect, the present disclosure provides an impact absorbing device including an outer sleeve and a core assembly disposed within the outer sleeve. The core assembly includes a first foam layer, a second foam layer, and an expanded metal sheet disposed between the first foam layer and the second foam layer. The first foam layer and the second foam layer are melted together to seal the expanded metal sheet between the foam layers.

In another aspect, the present disclosure provides a method of manufacturing an impact absorbing device. The method includes positioning a bendable structural element between first and second foam layers, melting adjacent edges of the first and second foam layers to bond the first and second foam layers together, such that the first and second foam layers and the structural element form an assembly. The method also includes inserting the assembly into an open end of a PVC-coated polyester sleeve, and welding closed the open end of the sleeve to seal the assembly inside the sleeve.

Any of the above referenced aspects of the disclosure can be combined with any one or more of the above referenced aspects of the disclosure. Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

Figure 1:
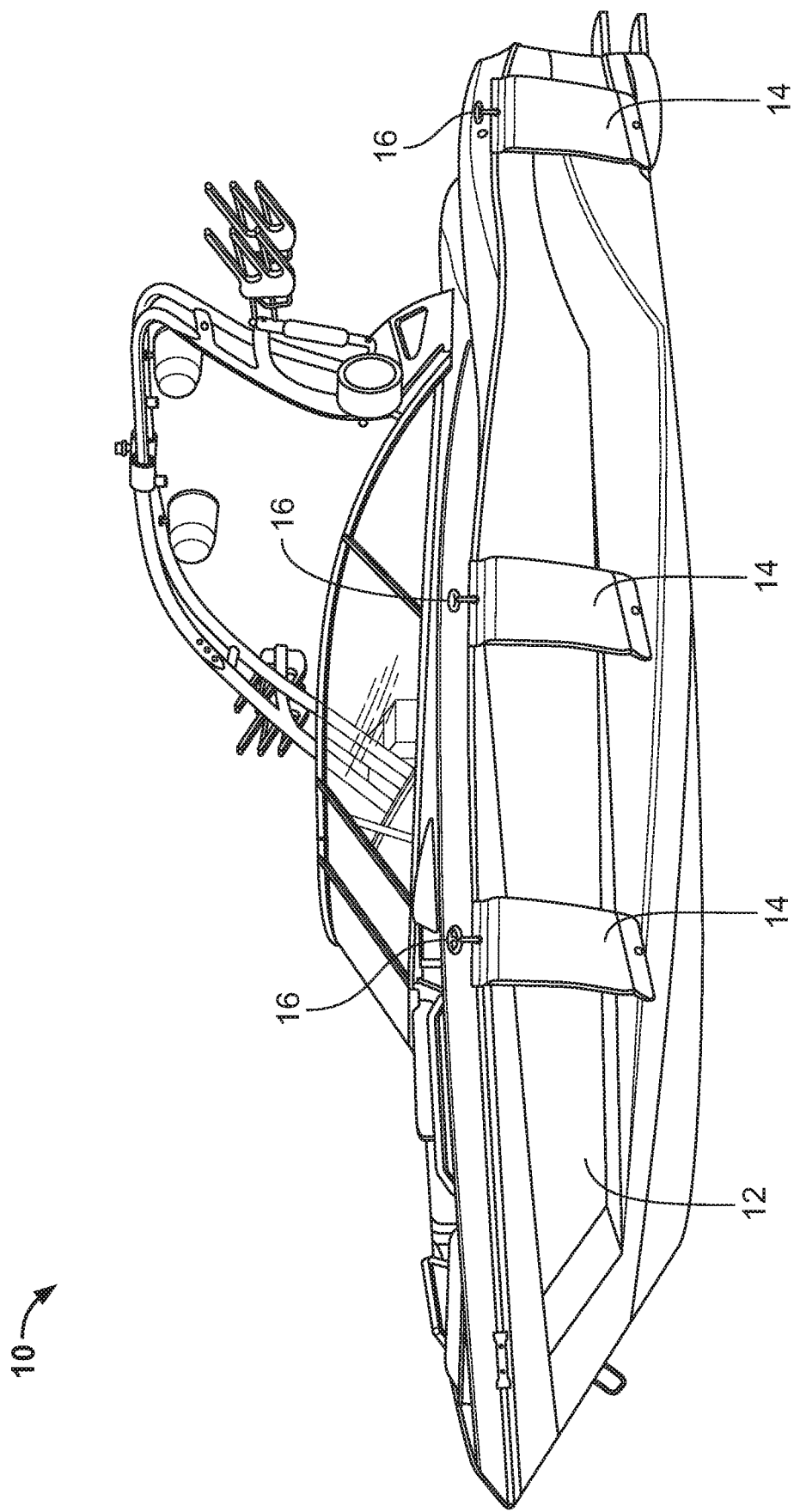
FIG. 1 is a perspective view of a boat including a plurality of fenders embodying aspects of the present disclosure.

FIG. 1 illustrates a boat 10 including a hull 12 and a plurality of impact absorbing devices 14 according to an embodiment of the present disclosure. In the illustrated embodiment, the impact absorbing devices 14 are configured as fenders and are suspended from cleats 16 to hang down along the hull 12. As such, the impact absorbing devices 14 may protect the hull 12 from impacts, scratches, and the like by inhibiting direct contact between the hull 12 and other objects (e.g., docks, other boats, lifts, etc.). It should be understood that the impact absorbing devices 14 may be used in connection with any other type of watercraft and may be coupled to the watercraft in various ways.

Figure 2:
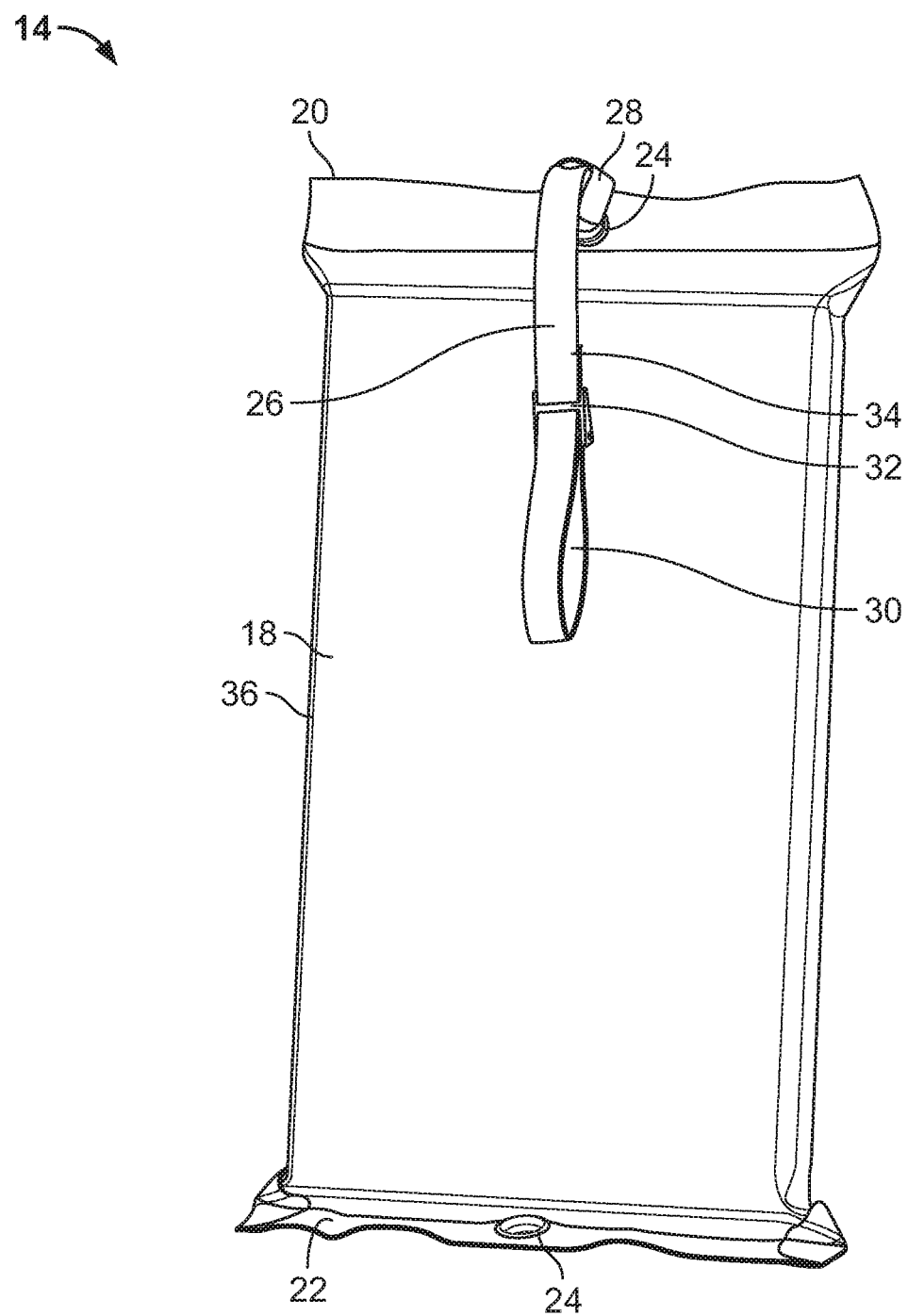
FIG. 2 is a perspective view of two fenders embodying aspects of the present disclosure.

With reference to FIG. 2, each impact absorbing device 14 has a generally rectangular main body 18 with a first end 20 and a second end 22 opposite the first end 20. Grommets 24 are located adjacent each of the ends 20, 22. In the illustrated embodiment, the impact absorbing device 14 includes a single grommet 24 at each end 20, 22. In other embodiments, the impact absorbing device 14 may include two or more grommets 24 at one or both of the ends 20, 22. The grommets 24 may be made of stainless steel, aluminum, or any other suitably durable and corrosion-resistant material.

With continued reference to FIG. 2, the impact absorbing device 14 further includes a strap 26 to facilitate attaching the impact absorbing device 14 to the boat 10 and positioning the impact absorbing device 14 at a desired height along the hull 12. The illustrated strap 26 is made of a polymer webbing, such as nylon, polyester, or polypropylene webbing. The strap 26 includes a fixed loop 28 formed at one end of the strap 26 and an adjustable loop 30 at an opposite end of the strap 26. In the illustrated embodiment, the adjustable loop 30 is formed via a clip 32 through which a free end 34 of the strap 26 extends. As such, the free end 34 of the strap 26 may be pulled or released relative to the clip 32 to adjust the size of the adjustable loop 30. In some embodiments, the clip 32 may include a buckle, snap, or other quick release coupling to facilitate opening and closing the adjustable loop 30.

The grommets 24 provide attachment points for the strap 26. In the illustrated embodiment, the strap 26 may be attached to either grommet 24 by passing the adjustable loop 30 of the strap 26 through the grommet 24 and then through the fixed loop 28. The adjustable loop 30 may then be coupled to the cleats 16 or any other suitable locations (e.g., hand rails, gunwales, etc.) on the boat 10.

Figure 3:
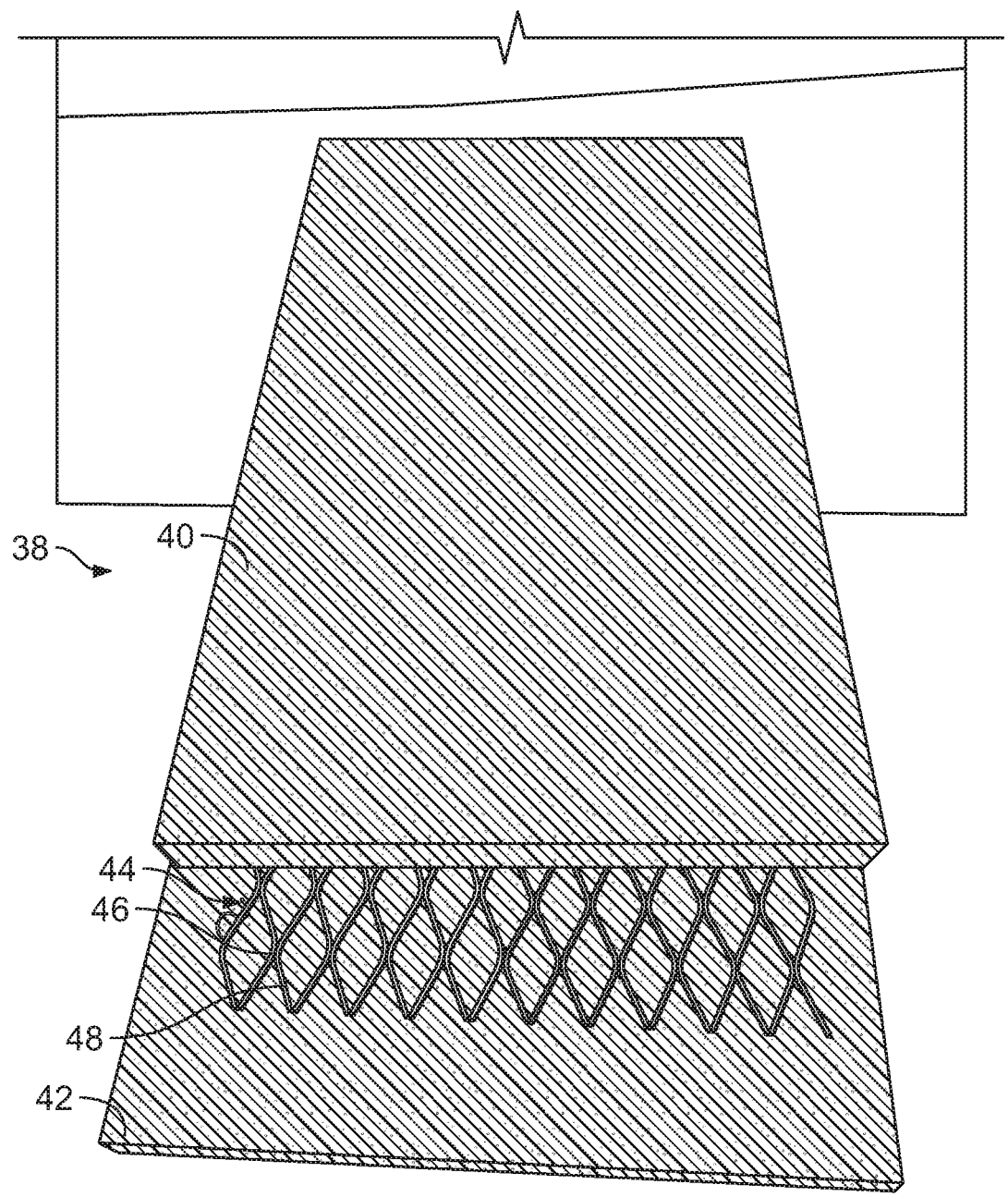
FIG. 3 is a perspective view illustrating an internal construction of each of the fenders of FIGS. 1 and 2.

With reference to FIGS. 2 and 3, the main body 18 includes a protective outer sleeve 36 (FIG. 2) that encloses an impact-absorbing core assembly 38 (FIG. 3). In the illustrated embodiment, the outer sleeve 36 is made of PVC-coated polyester, which is durable, puncture-resistant, tear-resistant, waterproof, and air-tight (i.e. impermeable to air). In the illustrated embodiment, the outer sleeve 36 has a tubular construction that extends continuously between the first and second ends 20, 22, and the outer sleeve 36 is welded closed at the first and second ends 20, 22. In other embodiments, the outer sleeve 36 may be constructed from two sheets of PVC-coated polyester welded together on all four sides. In other embodiments, the outer sleeve 36 may be made of other suitable materials, such as chlorosulfonated polyethylene (CSPE) synthetic rubber, which is also known as Hypalon® produced by DuPont®.

The PVC-coated polyester material of the outer sleeve 36 is also relatively lightweight. In some embodiments, the outer sleeve 36 has a weight of 32 ounces per square foot. In other embodiments, the outer sleeve 36 has a weight of 28 ounces per square foot. In other embodiments, the outer sleeve 36 has a weight of 22 ounces per square foot. Thus, in some embodiments, the outer sleeve 36 may have a weight between 22 and 32 ounces per square foot.

Referring to FIG. 3, the core assembly 38 includes a first foam layer 40, a second foam layer 42, and a structural element 44 sandwiched between the foam layers 40, 42. The first foam layer 40 and the second foam layer 42 are made of closed-cell foam. For example, in some embodiments, the foam layers 40, 42 are made of closed-cell, recycled polyethylene foam. Each of the layers 40, 42 is about one inch thick, such that the foam layers 40, 42 can effectively cushion impacts. In other embodiments, the core assembly 38 may include a different number of foam layers of different thicknesses. For example, in some embodiments, the core assembly 38 may include four layers of ½-inch thick foam.

The structural element 44 is made of a high-strength ductile material capable of bending to a desired shape and maintaining that shape. In the illustrated embodiment, the structural element 44 includes an expanded metal sheet 46. The expanded metal sheet 46 includes an array of generally diamond-shaped openings 48. The openings 48 may have a nominal size between about ½-inch and 1-inch in some embodiments. The expanded metal sheet 46 may be made of stainless steel or aluminum, which are particularly suitable materials due to their fatigue resistance and high corrosion resistance. In the illustrated embodiment, the expanded metal sheet 46 has a 13-gauge thickness. In other embodiments, the structural element 44 may be made with other materials and/or thicknesses to provide desired bendability.

The foam layers 40, 42 are bonded together (e.g., via melting, chemical adhesives, or the like) on all sides to fully encapsulate the structural element 44 between the foam layers 40, 42. Because the foam layers 40, 42 are made of closed-cell foam, they protect the structural element 44 from any water that may infiltrate through the outer sleeve 36 (e.g., if the outer sleeve 36 becomes damaged). In addition, the foam layers 40, 42 separate the structural element 44 from the outer sleeve 36 to prevent any edges of the structural element 44 from directly contacting the interior of the outer sleeve 36.

Figure 4:
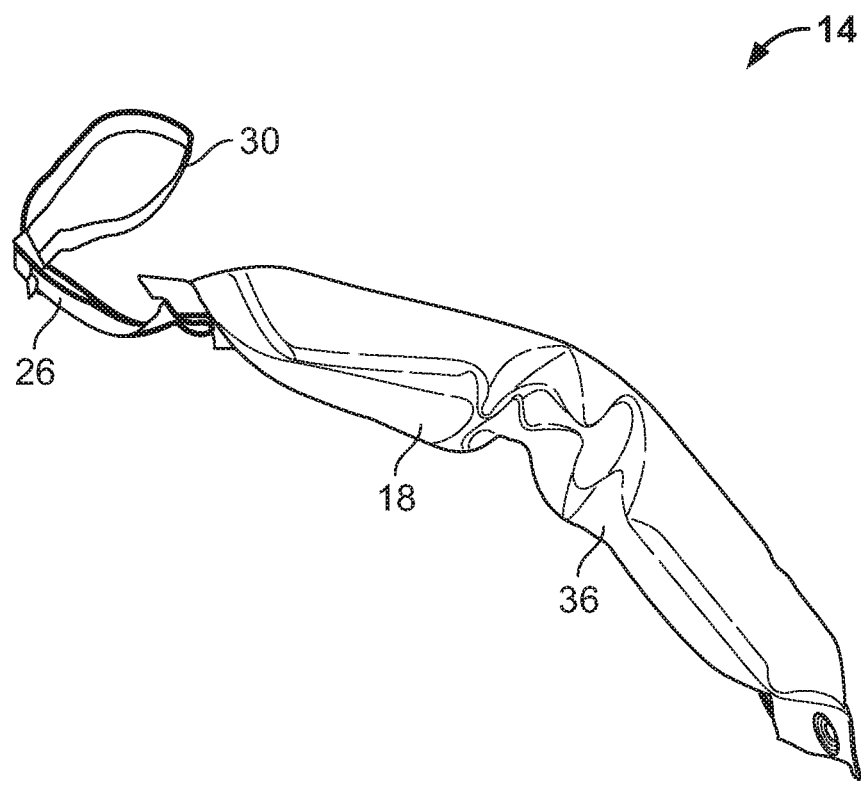
FIG. 4 is a perspective view of one of the fenders of FIGS. 1 and 2 in a first adjusted configuration.
Figure 5:
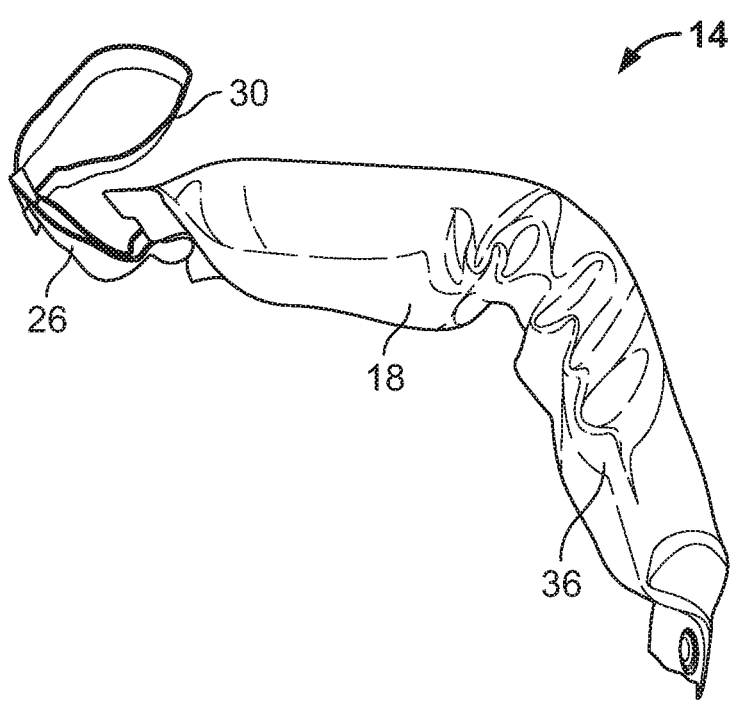
FIG. 5 is a perspective view of the fender of FIG. 4 in a second adjusted configuration.

As illustrated in FIGS. 4 and 5, the impact absorbing device 14 can be shaped by hand to conform to the hull 12 or gunwales of the boat 10. Specifically, a user may grasp the impact absorbing device 14 and bend it into a desired orientation. The structural element 44 is sufficiently thin and deformable to allow the user to bend the impact absorbing device 14 with relative ease, but strong enough to maintain the shape of the impact absorbing device 14 after it is bent. That is, the impact absorbing device 14 is bendable to a bent configuration, such as the bent configurations illustrated in FIGS. 4 and 5, under an external force. The impact absorbing device 14 remains in the bent configuration upon removal of the external force.

Referring to FIG. 1, by shaping each of the impact absorbing devices 14 to the hull 12 of the boat 10, the impact absorbing devices 14 remain in place and better protect the boat 10 from impacts that may occur when the boat 10 is docked. The durable and waterproof outer sleeve 36 protects the impact-absorbing core assembly 38 from the elements. Should the outer sleeve 36 be punctured, the closed-cell foam layers 40, 42 of the core assembly 38 remain waterproof and protect the structural element 44 from water infiltration. Finally, the foam layers 40, 42 advantageously make the impact absorbing device 14 buoyant.

Figure 6:
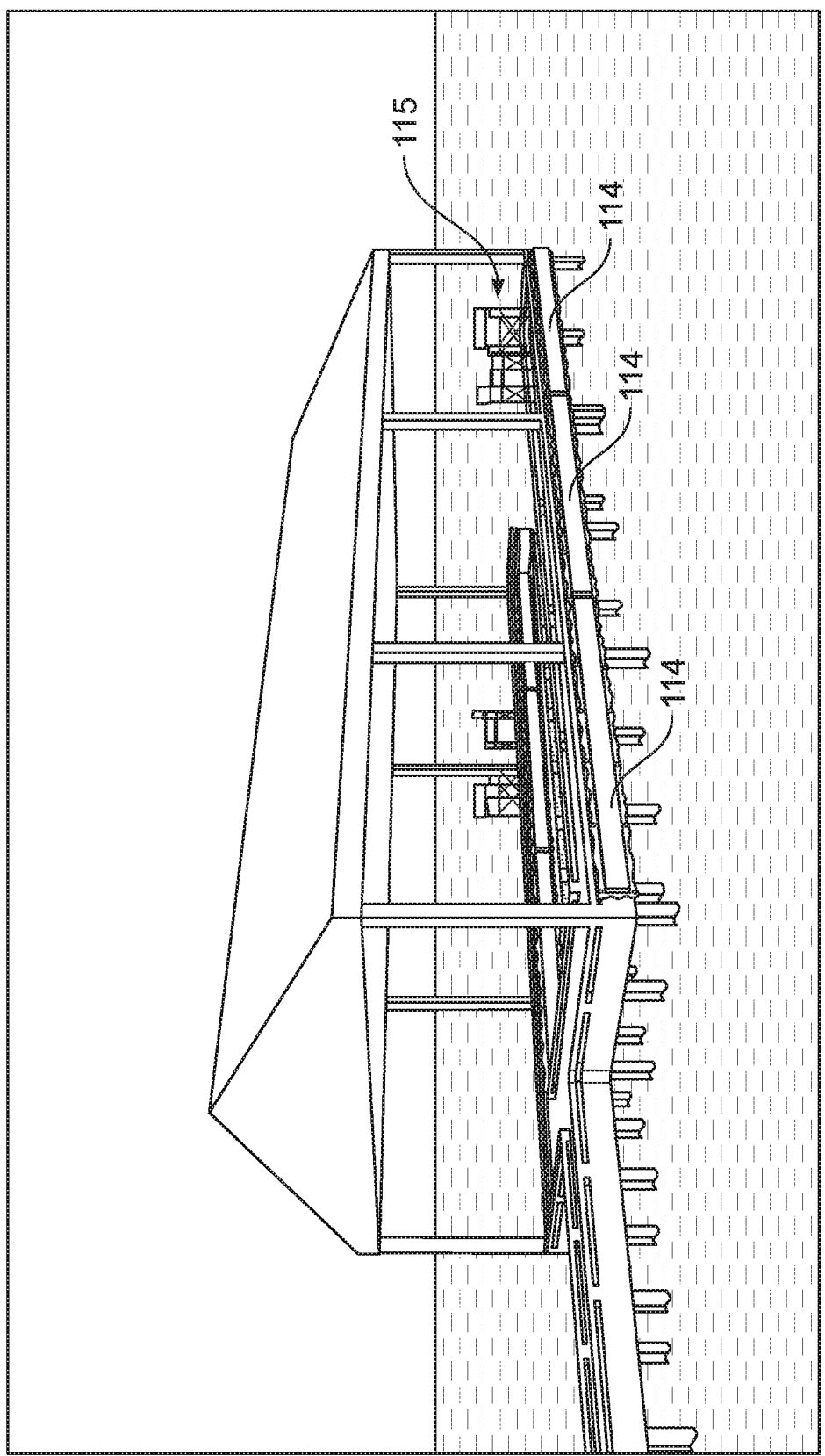
FIG. 6 is a perspective view of a dock including a plurality of dock bumpers embodying aspects of the present disclosure.

FIG. 6 illustrates impact absorbing devices 114 according to another embodiment of the present disclosure. The illustrated impact absorbing devices 114 are configured as dock bumpers and are coupled to the sides of a dock 115. Each of the impact absorbing devices 114 is similar to the impact absorbing device 14 described above with reference to FIGS. 1-5. As such, the impact absorbing devices 114 may be bent to conform to bends and corners of the dock 115.

Figure 7:
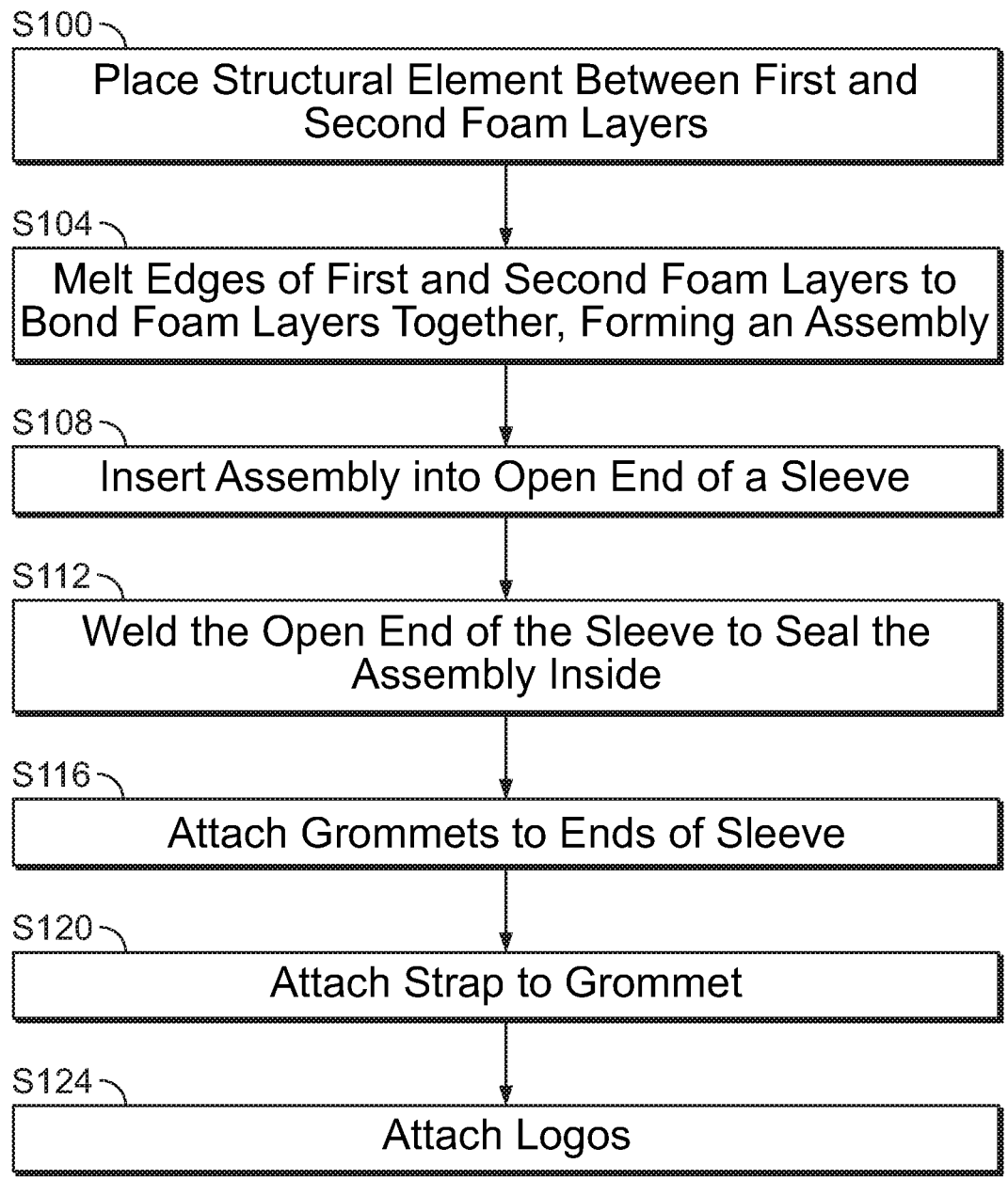
FIG. 7 is a flow chart illustrating a method of manufacturing an impact absorber, such as the fenders of FIGS. 1-5 or the bumper of FIG. 6.

FIG. 7 illustrates a method of manufacturing an impact absorbing device, such as the impact absorbing devices 14, 114 described above with reference to FIGS. 1-6. The method is described with reference to the features and elements of the impact absorbing device 14. In the illustrated embodiment, the method includes assembling the core assembly 38 by first placing the structural element 44 between the first and second foam layers 40, 42 at step S100. In some embodiments, the structural element 44 may be cut to a size that is about 2-inches smaller in length and width than each of the foam layers 40, 42. The structural element 44 is then centered between the foam layers 40, 42 to leave approximately 1-inch between each edge of the structural element 44 and the respective edges of the foam layers 40, 42.

Next, at step S104, the edges of the first and second foam layers 40, 42 are melted to bond the foam layers 40, 42 together. For example, in some embodiments, the edges of the foam layers 40, 42 are heated to a temperature of about 450 degrees Fahrenheit to melt the edges. The structural element 44 is thus sealed between the foam layers 40, 42, completing the core assembly 38. The core assembly 38 is inserted into an open end (e.g., the end 20) of the outer sleeve 36. The open end is then welded to seal the core assembly 38 within the outer sleeve 36 at step S112. Once sealed, the outer sleeve 36 provides a waterproof and air tight enclosure for the core assembly 38.

Next, at step S116, the grommets 24 are attached to the ends 20, 22 of the outer sleeve 36. Once the grommets 24 are in place, the strap 26 is attached to one of the grommets 24 (e.g., by passing the adjustable loop 30 of the strap 26 through the grommet 24 and then through the fixed loop 28; FIG. 2). Finally, one or more logos, labels, decorative designs, or the like may be attached to or printed on the outer sleeve 36. In some embodiments, raised logos made from rubber, silicone, or the like can be welded to the outer sleeve 36 or bonded to the outer sleeve 36 using adhesive.

Although the present disclosure has been described in detail with reference to certain preferred embodiments, variations and modifications exist within the scope and spirit of one or more independent aspects of the disclosure as described.

Various features of the present disclosure are set forth in the following claims.

What is claimed is:

1. An impact absorbing device comprising:
   a waterproof outer sleeve; and
   a core assembly including
      a bendable structural element, and
      a foam material encasing the bendable structural element,
      wherein the core assembly is disposed within the outer sleeve.

2. The impact absorbing device of claim 1, wherein the structural element is bendable to a bent configuration under an external force, and wherein the structural element is configured to remain in the bent configuration upon removal of the external force.

3. The impact absorbing device of claim 1, wherein the foam material includes closed-cell foam configured to provide a waterproof barrier around the structural element.

4. The impact absorbing device of claim 1, wherein the structural element includes an expanded metal sheet.

5. The impact absorbing device of claim 1, wherein the outer sleeve includes a first end, a second end opposite the first end, and a grommet coupled to the outer sleeve adjacent the first end.

6. The impact absorbing device of claim 5, further comprising a strap extending through the grommet.

7. The impact absorbing device of claim 1, wherein the outer sleeve is made of PVC-coated polyethylene.

8. The impact absorbing device of claim 1, wherein the outer sleeve is made of chlorosulfonated polyethylene synthetic rubber.

9. The impact absorbing device of claim 1, wherein the outer sleeve is air-tight.

10. An impact absorbing device comprising:
    an outer sleeve; and
    a core assembly disposed within the outer sleeve, the core assembly including
       a first foam layer,
       a second foam layer, and
       an expanded metal sheet including a lattice structure disposed between the first foam layer and the second foam layer,
    wherein the first foam layer and the second foam layer are melted together to seal the expanded metal sheet between the foam layers.

11. The impact absorbing device of claim 10, wherein the outer sleeve is waterproof and air-tight.

12. The impact absorbing device of claim 10, wherein the first foam layer and the second foam layer are made of a closed-cell foam material configured to provide a waterproof barrier around the expanded metal sheet.

13. The impact absorbing device of claim 10, wherein the outer sleeve is made of a waterproof material having weight between 22 and 32 ounces per square foot.

14. The impact absorbing device of claim 10, wherein the expanded metal sheet is bendable to a bent configuration under an external force, and wherein the structural element is configured to remain in the bent configuration upon removal of the external force.

15. The impact absorbing device of claim 10, wherein the outer sleeve includes a first end, a second end opposite the first end, and a weld adjacent the first end, and wherein the impact absorbing device further comprises a grommet coupled to the outer sleeve such that the grommet surrounds an opening extending through the weld.

16. The impact absorbing device of claim 15, further comprising a strap extending through the opening, wherein the impact absorbing device is configured to be suspended by the strap.

17. A method of manufacturing an impact absorbing device, comprising:
    positioning a bendable structural element between first and second foam layers;
    melting adjacent edges of the first and second foam layers to bond the first and second foam layers together, wherein the first and second foam layers and the structural element form an assembly;
    inserting the assembly into an open end of a sleeve; and
    welding closed the open end of the sleeve to seal the assembly inside the sleeve.

18. The method of claim 17, wherein the first and second foam layers are made of a closed-cell foam material, and wherein the sleeve is made of PVC-coated polyethylene or chlorosulfonated polyethylene synthetic rubber.

19. The method of claim 17, wherein, after welding, the sleeve provides a waterproof and air-tight barrier around the assembly.

20. The method of claim 17, further comprising attaching a grommet to the sleeve; and inserting an adjustable length strap through the grommet.

* * * * *